(12) United States Patent
Nummelin et al.

(10) Patent No.: US 6,308,164 B1
(45) Date of Patent: *Oct. 23, 2001

(54) DISTRIBUTED PROJECT MANAGEMENT SYSTEM AND METHOD

(76) Inventors: Jeff Nummelin, 14 Rock Ridge Rd., St. Johnsbury, VT (US) 05819; Mark Young, 124 Florence St., Brockton, MA (US) 02401; John Lanata, 323 Country Way, Scituate, MA (US) 02066

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/847,687
(22) Filed: Apr. 28, 1997
(51) Int. Cl.[7] .................................................. G06F 17/60
(52) U.S. Cl. ............................................... 705/9; 707/1
(58) Field of Search .................... 705/9; 707/1; 345/302

(56) References Cited

U.S. PATENT DOCUMENTS

| | | | | |
|---|---|---|---|---|
| 5,418,957 | * | 5/1995 | Narayan | 395/700 |
| 5,548,506 | * | 8/1996 | Srinivasan | 705/8 |
| 5,649,190 | * | 7/1997 | Sharif-Ashary et al. | 395/612 |
| 5,687,385 | * | 11/1997 | Janay | 395/767 |
| 5,758,355 | * | 5/1998 | Buchanan | 707/201 |
| 5,884,310 | * | 3/1999 | Brichta et al. | 707/10 |
| 5,884,325 | * | 3/1999 | Bauer et al. | 707/201 |

FOREIGN PATENT DOCUMENTS

WO-0021000-A1 * 4/2000 (WO) ............................. G06F/17/30

OTHER PUBLICATIONS

R.E. Brown et al., "Systems Integration Using Case Tool Development Software", Proceedings of the IEEE 1996 National Aerospace and Electronics Conference, May 1996, p. 818–824.*

Maggie Page, "CASE tool makes for quick, methodical development", Infoworld, Dec. 9, 1996, p. 116.*

Andreas R. Diener et al, "Replicating and Allocating Data in a Distributed Database System for Workstations", ACM, p. 5–9, 1985.*

Arthur Tatnal et al, "Project Management Software–the Fourth Tool", Software Education Conference, p. 320–325, 1995.*

Xiaolie Qian et al, "Consistency Management in A Project Management Assistant", ACM, p. 34–43, Aug. 1990.*

Gomer Thomas et al, "Heterogeneous Distributed Database Systems for Production Use", ACM, p. 237–265, Sep. 1990.*

Susan B. Davidson et al, "Consistency in Partitioned Neworks", Computing Serveys, p. 341–370, Sep. 1985.*

* cited by examiner

Primary Examiner—Tariq R. Hafiz
Assistant Examiner—Marc Norman
(74) Attorney, Agent, or Firm—McDermott, Will & Emery (57) ABSTRACT

An enterprise project management system includes a system for creating new projects and adding project tasks and resources to the system. Information used to create the projects, project tasks and resources is input at a workstation that may or may not be connected to the enterprise network. The information used to create projects, project tasks and resources includes primary and secondary information. The primary information is essential to the project management system for storing the project, project task and resource and for creating or modifying the project schedules. The secondary information is categorization or classification information useful for reporting and not essential to the scheduling function of the system. The secondary information fields are validated by comparing at least some of them with a set of predefined valid values for each field.

19 Claims, 3 Drawing Sheets

DISTRIBUTED PROJECT MANAGEMENT SYSTEM AND METHOD

COPYRIGHT NOTICE

Copyright 1997, Information Management Services, Corp. A portion of the disclosure of this patent document contains material which is subject to copyright protection. The copyright owner has no objection to facsimile reproduction by anyone of the patent document or the patent disclosure, as it appears in the U.S. Patent and Trademark Office patent file or records, but otherwise reserves all copyright rights whatsoever.

CROSS-REFERENCE TO RELATED APPLICATIONS

Not Applicable

STATEMENT REGARDING FEDERALLY SPONSORED RESEARCH

Not Applicable

REFERENCE TO SOFTWARE APPENDIX

Appendix A contains 19 pages.

BACKGROUND OF THE INVENTION

This invention relates to data object categorization and validation and, more particularly, to a system which provides for creation, tracking and reporting of data objects based upon predefined and validated categories.

In the Enterprise Network Environment, organizations gather and analyze a tremendous amount of data relating to all the various activities of an organization's resources. This data could relate to the performance of services, such as managing projects and resources or the distribution and sale of products. The information gathering process begins with the creation of a data object relating to the activity to be monitored and analyzed.

For example, in a project management system, projects and tasks associated with each project must be created and stored in the enterprise or primary database before the project management system to begin collecting data relating to the performance of each project or task. In an enterprise or distributed environment, the project managers and resources they manage (typically people) may be distributed geographically and their connection to the enterprise network and the enterprise database may be periodic or mobile, such as a salesperson traveling or a consultant at a client site. Typically, these remote users enter information offline and later connect to the network via a wide area network (WAN) connection (such as a dialup connection or over the Internet) to upload or download information.

In one prior art system, the project managers create projects and assign tasks offline using a local database resident on their workstation. This local database replicates resource and project information needed by the project manager to manage his or her resources. This information can be updated whenever a connection is established to the enterprise network and the enterprise database. In a similar manner, the manager's resources log hours and costs associated with projects and tasks, also offline, using a local database that replicates the project and task information from the enterprise database.

In these prior art systems, project managers create projects and tasks in the project management system by assigning a label (a descriptive name or title) to the project or task and providing additional primary information. This primary information is information that is essential for the native application to perform its native function, typically, task/resource scheduling. In the project management system, the primary information is information essential to enable the scheduling algorithm (typically a critical path or best fit algorithm) to perform native scheduling functions. Such as predicting project completion dates and reporting resource allocation. In addition, each project and task can include a number of additional fields for tracking and reporting purposes. This secondary information can include categories for classifying projects, tasks and resources within the entire organization or enterprise. This information can include a client or customer name or project number as well as other information relating to the type of tasks performed. The secondary information can be used later for reporting purposes.

In many instances, it is desirable to monitor and report the status of a particular type of task (such as software development) or of particular types of tasks performed for all the projects of a particular client. In the prior art systems, an enterprise database query based upon the secondary information recorded in the additional fields of the project and task database is used to extract this data. However, if the secondary information recorded in the additional fields is not complete and consistent, the database query will yield incomplete results. For example, if three separate project managers worked on the software component, the hardware component and the production aspects of a research and development project, the software manager might assign a task and specify the type (category) as "Software Development", the hardware manager may assign a different task and specify the type as simply "Research and Development" and the production manager may assign yet another task and also specify the type as "Research and Development". (Note that any of the managers could have left the field blank.) A problem arises because the content type field is different for two tasks and the same for two tasks and thus, there is no way to efficiently query the data base in order to determine the total "Research and Development" for the project or to determine which tasks are associated with production research and development as opposed to hardware research and development.

Accordingly, it is an object of this invention to provide an improved system for storing information relating to data objects in a database.

It is another object of this invention to provide an improved system for storing information relating to data objects in a database that provides for more complete and accurate analysis and reporting of the database.

It is yet another object of this invention to provide an improved project management system for storing information relating to projects, project tasks and resources.

It is a further object of this invention to provide an improved project management system for storing, analyzing and reporting information relating to projects, project tasks and resources which provides for consistent entry of classification and categorization information useful for analyzing and reporting information relating to projects, project tasks and resources.

It is a further object of this invention to provide an improved project management system for storing, analyzing and reporting information relating to projects, project tasks and resources which provides for validation of information useful in project analysis and reporting that is not essential to native function of the project management system.

SUMMARY OF THE INVENTION

The invention is directed to improvements in organizing information stored in databases that are accessed through enterprise networks. These databases are typically composed of data objects which are used by various applications to perform native functions such as project management or document/file creation and storage. In accordance with the invention, when the data objects are created and stored in the database, the system requires that specific additional information, useful for analyzing and reporting, is required before the data object can be stored in the data base. This additional information is validated with respect to a predefined set values in order to insure that the information is complete and consistent over all the data objects stored. This insures that later analysis and reporting based upon this additional information is complete and accurate.

In accordance with the invention, a database management system includes a database server for storing data objects in a primary database. The system also includes a workstation for inputting data objects to be stored in the primary database and a data transport system, such a local area network (LAN) for transferring data between the workstation and the database. The system further includes a data processing application for processing the data objects in accordance with the native function of the native application. The native application includes a subsystem for creating and storing the data objects in the primary database. The data object includes primary and secondary information that is to be stored in the database. The primary information includes information essential for the data processing application to perform its native function or for storing the data object in the primary database. The secondary information includes data object category information which is not essential for the data processing application to perform its native function or for storing the data object in the primary database. The system also includes a subsystem for validating at least a portion of the secondary information with respect to a second database and for preventing the data object from being stored in the centralized database if the portion of the secondary information cannot be validated.

The workstation can be disconnected from the transport system during the period at which the data processing application is creating and storing data objects. The workstation can include a local database in which the data objects are stored when the workstation is disconnected from the transport system. The workstation can also include a secondary database which includes the second database of values for validating the secondary information and the subsystem prevents the data object from being stored in the local database if the required portion of the secondary information cannot be validated.

The second database can be a separate database stored in the database server and a copy can be provided in the memory of the workstation or the second database can be part of the primary database and stored in the local database at the workstation.

In accordance with an alternate embodiment, the invention is directed to a project management system. The project management system includes a database server for storing project management information in a primary database. The system can also include a workstation for inputting project management information and a local database for storing the project management information at the workstation. The project management information includes information for creating project data objects such as projects, project tasks and resources. The system can include a data transport system for transferring the project management information between the workstation and the centralized database server. The workstation includes a project management scheduling system for creating and storing project management information about projects, project tasks and resources and for performing native project management scheduling functions. The project management information includes primary information and secondary information. The primary information includes information essential for the creating and storing a project, a project task or a resource within the project management scheduling system. The secondary information includes project, task or resource category information useful for reporting purposes and not essential for creating and storing a project, a project task or a resource within the project management schedule system. The project management system also includes a subsystem for validating at least a portion of the secondary information with respect to a second database and for preventing the project management information from being stored in the local database if the required portion of the secondary information cannot be validated.

The workstation can be disconnected from the transport system during the period at which the project management scheduling system is creating and storing the project management information and the project management information can be stored in the local database. The workstation can include a communication system for connecting the workstation to the transport system in order to transfer project management information between the workstation and the centralized database server. The workstation can also include a secondary database which includes the second database of values for validating the secondary information and the project management system can prevent the project management information from being stored in the local database if the required portion of the secondary information cannot be validated.

The second database can be a separate database stored in the database server and a copy of the second database can be provided in the memory of the workstation. Alternatively, the second database can be part of the primary database and stored in the local database at the workstation.

The invention is also directed to a method of creating project information in a project management system, wherein the system includes a database server for storing a primary database, a workstation for inputting project management information and for storing the project management information in a local database and a project management system for processing the project management information and for performing native project management functions. The system also includes a transport systems for transferring the project management information between the workstation and the centralized database server. The method includes the steps of creating the project management information as a function primary and secondary information that is input to the workstation. The primary information includes information essential to creating a project, project task or resource within the project management system. The secondary information includes project management information not essential to creating projects, project tasks or resources within the project management system and useful for performing project reporting functions. The method also includes the step of validating at least a portion of the secondary information with respect to a second database and preventing the creation of the project, project task or resource if the secondary information is not valid with respect to the second database.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The invention is directed to enterprise systems which are used by organizations to manage information. Typically, this information is stored in one or more databases which may be accessed via the enterprise network. In order to manage and analyze this information more efficiently and effectively, it is advantageous to classify or categorize this information to enable reporting over the enterprise. Further benefits are derived by requiring the information to be classified during storage and by predefining the classes or categories such that they are consistent for every unit of information stored in the entire enterprise system of the organization.

Figure 1:
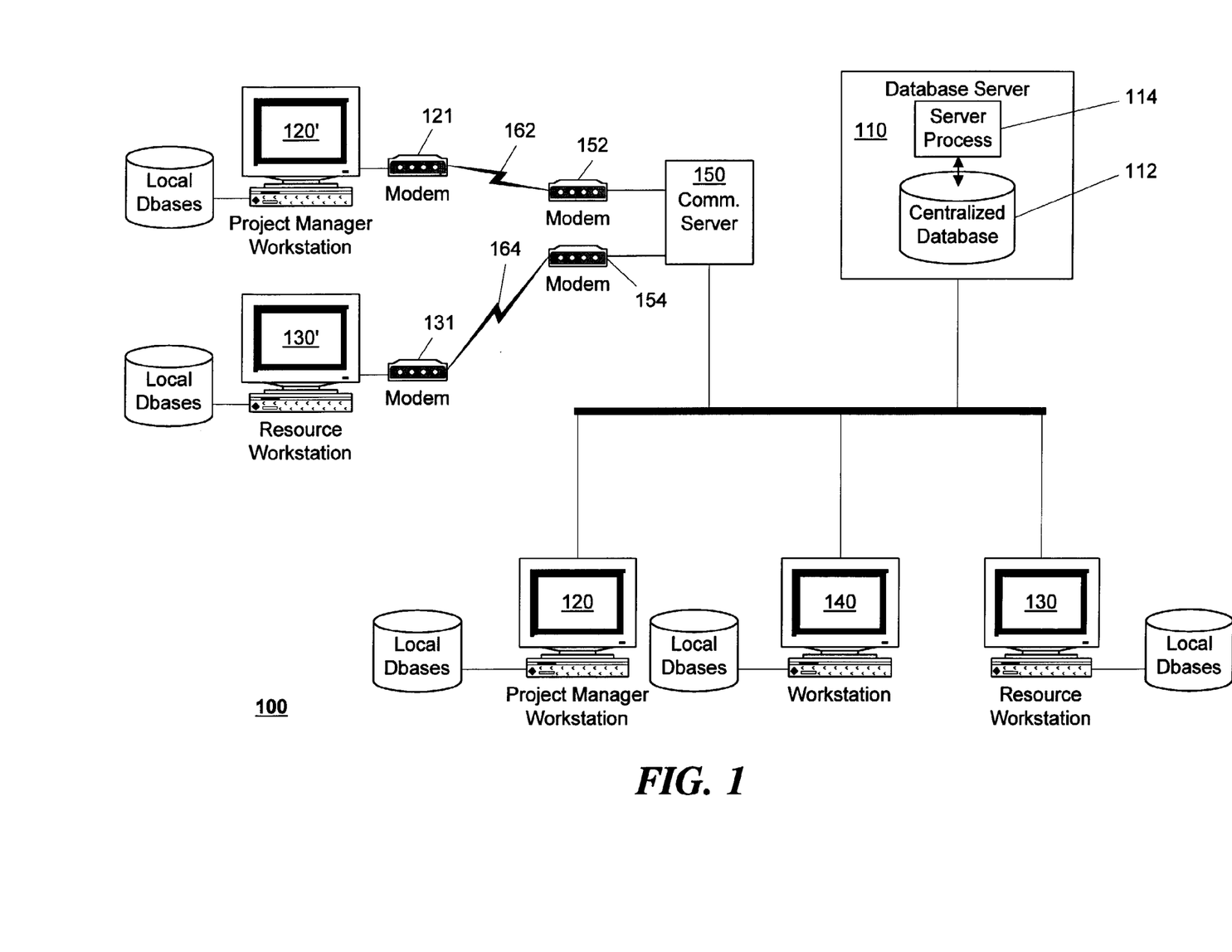
FIG. 1 is a diagrammatic view of an enterprise project management system in accordance with one embodiment of the invention.

FIG. 1 shows a distributed project management system 100 in accordance with one preferred embodiment of the invention. A project management system 100 is a system that can facilitate planning and scheduling the tasks of a project, managing project resources and reporting the progress of a project toward reaching project goals. During the planning stage of the project, project management information including projects, project tasks and system resources (herein referred to as project management information) is input into the project management system 100 where it is used to create and store project data objects in a primary database. The project management system 100 uses this information to create a project schedule. Once a project schedule is created, task status information is input in to the project management system in order to monitor and report project progress.

A project is a sequence of tasks utilized to achieve an end result. Within a project, each task is defined in terms of the resources used, the task duration and the order in which the task is performed relative to other tasks. The native functions of a project management system can include producing a schedule of tasks for a given project, reporting conflicts relating to resource utilization and/or monitoring the progress of the project toward completion based upon input task status information.

A distributed project management system 100 is a system in which the project manager, the project resources and the project data can be distributed over the extent of an enterprise network environment. Typically, the central office of an organization includes a database server 115 and associated local area network (LAN) 105 which stores the input project management information in a primary database 112. The project managers and the project resources can be located either at the central office or at remote sites and can access the enterprise network via local workstations 120, 130 and 140 which are directly connected to the network or via remote workstations 120' and 130' which are periodically connected to the network (such as by modems 121 and 131).

Project managers input project, project task and resource information and monitor project and task status at project manager workstations 120, 120'. Project resources receive task assignments and input task status at resource workstations 130, 130'. References to project manager and resource workstations are merely labels provided for the convenience of the reader to facilitate an understanding of the invention. Any workstation, for example workstation 140, can function as either a project manager workstation or a resource workstation. The function supported by a particular workstation is determined by the access level of the user. Thus, a project manager who is also a project resource could log into a workstation and that workstation would function as both a project manager workstation and resource workstation. A project resource, who is not a project manager, would not be given access to project manager functions and would be limited to resource functions such as retrieving task assignments and reporting task status. In addition, the workstations can be used to perform project analysis and reporting functions.

In accordance with one preferred embodiment, the project managers can input project information (create or modify projects, project tasks and resources) from remote locations using a remote workstation 120' such as an offsite desktop or portable computer which can be connected to the enterprise network via a wide area network (WAN) connection 162 such as a telephone network using a modem 121. This enables the project manager to enter information offline. This is accomplished by creating a local database in the memory of the remote workstation 120' which includes a copy of the project management information stored in the primary database 112. During the creation of new projects, project tasks or resources, the new information is stored in the local database. The remote workstation can also be connected to the enterprise network via a WAN connection 164 using a modem 131 in order to update the primary database 112 with the new project information or update the local database with new project information or with task status data.

The project management system also receives information from project resures regarding the status of project tasks. This information includes when the task was started, the progress of the task toward completion and when the task was completed. In the case where the resource is one or more people, a person would enter the data regarding the task status at a resource workstation 130, 130'. Where the resource is a piece of equipment, the device may be sophisticated enough to report task status to the project management system directly or a person responsible for the operation of that piece of equipment would generally be responsible for inputting task status for the equipment resource at the resource workstation 130, 130'.

The distributed project management system 100 also includes a data transport mechanism for transferring data between the workstations 120, 120', 130, 130' and the primary database 112. In the preferred embodiment, this is accomplished using electronic mail (E-mail) over a LAN to send project information using E-mail messages transferred between the workstation and the database server in order to transfer project data objects and status data objects to and from the primary database 112. In this embodiment, the project management system uses Microsoft Project as the scheduling engine and Microsoft Mail as the E-mail transport which is integrated into the project management system using Microsoft's Mail Applications Programming Interface (MAPI). Alternatively, other well known data transport mechanisms can be used such as client/server interfaces, hypertext transfer protocol (HTTP) and hypertext markup language (HTML), network protocols such as Internet Protocol (IP) or NetBIOS.

Figure 2:
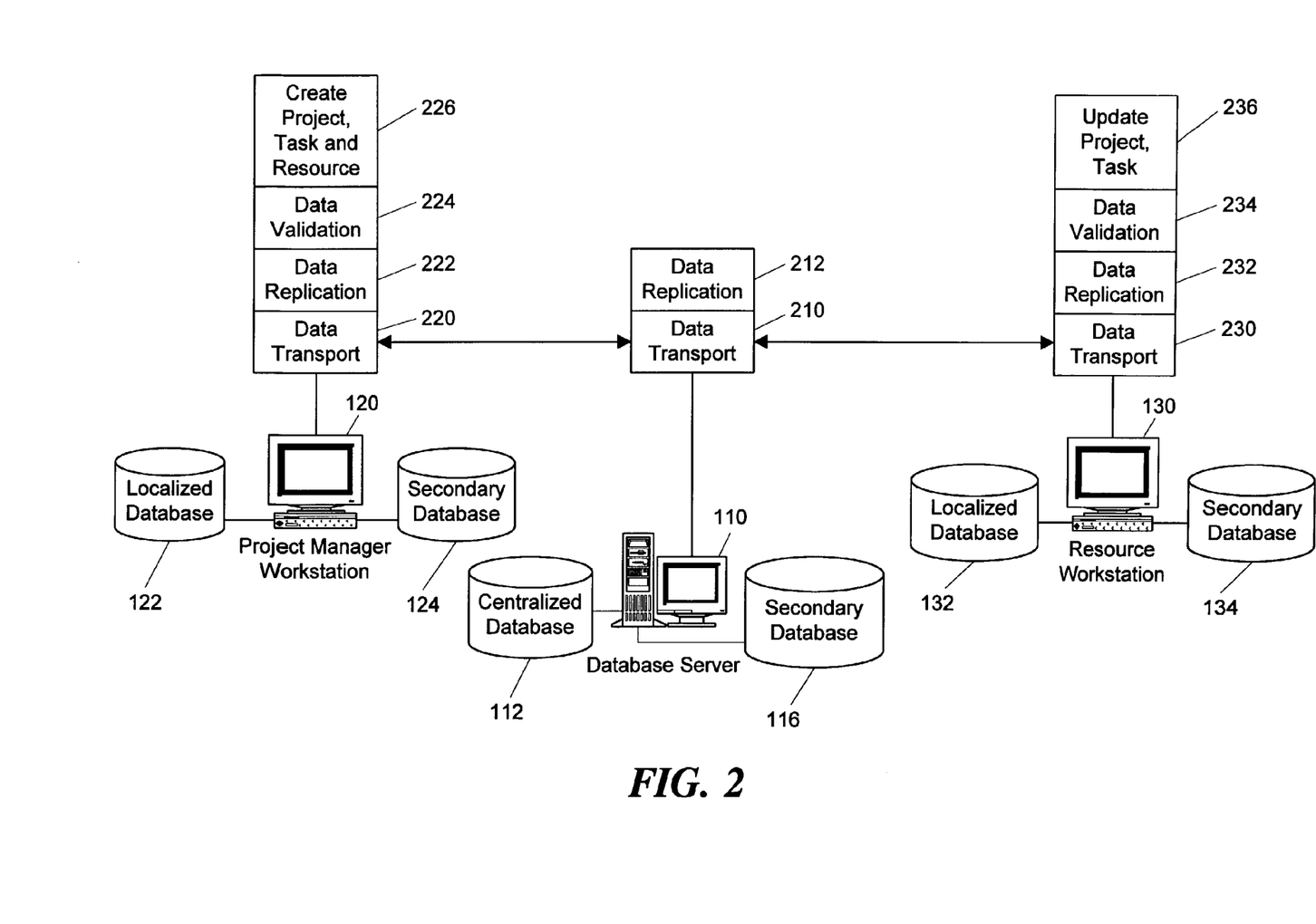
FIG. 2 is a block diagram of an enterprise project management system in accordance with one embodiment of the invention.

FIG. 2 shows a block diagram of the functions performed by the project manager workstation 120, the resource workstation 130 and the database server 110 in accordance with the invention. In accordance with the preferred embodiment, the project manager workstation 120 and the resource workstation 130 are IBM PC compatible personal computers using the Microsoft Windows 95 Operating System and the database server 110 is also an IBM PC compatible computer using the Microsoft Windows NT Server Operating System and Microsoft SQL Server database management software. The workstations 120, 130 and the database server 110, each use Microsoft Mail and MAPI as the data transport mechanism 220, 230, 210 respectively, which enables the workstations 120, 130 and the database server 110 to exchange data. In addition, the workstations 120, 130 and the database server 110 each include a replication mechanism 222, 232, 212 respectively, which allows the workstations 120, 130 to replicate all or a portion (i.e., relating to one or a few projects) of the data stored in the primary database 112 in a local database 122, 132 at the workstation. The replication mechanism 222, 232, 212 also enables the workstations to update the primary database 112 with information that was entered offline.

The project manager workstations 120 are used to create, modify and validate project information (projects, project tasks and resources) and to receive project data including task status input by resources at resource workstations. In the preferred embodiment, this is accomplished using Microsoft Project, project management software operating on the workstation. The project management software includes a function 226 for creating or modifying projects, tasks and resources by providing fields into which a project manager inputs primary and secondary information. In accordance with the invention, the software has been modified to include a function 224 for validating the information input into specific fields as predefined by project management system. Project resources use resource workstations to receive project task information and task assignments and to input or update project data including task status 236. In a similar manner, the project management software used by the project resources has been modified to include a function 234 for validating the information input. Appendix A is an example of Visual Basic Source Code which implements the validation functions in accordance with the preferred embodiment of the invention.

The project management process begins with the development of a project plan. The information from the project plan is input by the project manager to a project manager workstation 120 and used to create project data objects which are stored in either a local or primary database. The project plan includes information relating to the project name or identifier, a series of project tasks and an assignment of resources to project tasks. In accordance with the invention, the information input for each project, each project task and each resource is composed of primary information fields and secondary information fields.

The primary information fields contain information that is essential to the native function of project management system, namely the scheduling of projects, project tasks and/or project resources. Typically, the native function of a project management system is defined by the project management methodology which dictates the processes used by the system 100 to determine project schedules, determine resource conflicts and/or track project time and costs. If information is omitted from one of the primary fields, the system 100 cannot process the input data to perform its native function, i.e. produce project schedules. If the information input into one of the primary fields is incorrect, the system 100 will process the information and produce an incorrect result.

Well known project management methodologies include Program Evaluation and Review Technique (PERT), Critical Path Method (CPM), Line of Balance (LOB) method and Best Fit method. In the preferred embodiment, the project management system uses the Microsoft Project scheduling engine which uses a Critical Path Methodology.

The secondary information fields contain other information that is not essential to the native function of the project management system 100 and is typically used in information reporting. In prior art systems, the information to be entered in secondary information fields is optional and can be left blank. One of the disadvantages of the prior art systems is that no restrictions are imposed upon the content of these secondary information fields and the information input is not necessarily consistent from project to project and from project manager to project manager. Thus, any attempt to analyze the data across multiple projects or multiple project managers will be incomplete. In accordance with one preferred embodiment of the invention, one or more of the secondary information fields must be completed and the content of each field is limited to a predefined set of values stored in a separate secondary database 124. These values can be predefined by management of the organization in order to monitor and report performance of the organization over multiple projects.

In accordance with one aspect of the invention, one or more of the secondary information fields can be validated with respect to a set of predefined values. These secondary information fields can be validated by comparing a manually entered field with a set of valid field values stored in a secondary database. Alternatively, the system can require the project manager to select the field value from a limited list, for example by what is commonly known as a "pick list."

In accordance with one preferred embodiment of the invention, the information relating to which of the secondary information fields must be completed and list(s) of field values that are valid can be stored in a secondary database 116 associated with the database server 110. The workstations 120, 130 can use the replication mechanism 222, 232, 212 to replicate the secondary database at the workstation to enable the project manager and the project resource to enter data offline. Alternatively, the required secondary information fields and valid field values can be part of the centralized database and replicated along with other portions of the centralized database into the localized database.

The secondary information fields can be interrelated whereby the value selected for a first field can be used to determine the set of values that are used to validate one or more additional fields such as a second field and a third field. For example, the first field may relate to a client designator or code and the second field may be limited to valid matters for a specific client. Alternatively, the first field may designate an organizational department, such as engineering or research and development and the second field may be limited to valid functions performed by each specific department.

In the preferred embodiment, the required secondary information fields and the set or sets of valid field values can be predefined prior to the creation of a project, task or resource. Alternatively, the project manager can have the authority to specify whether a secondary information field is required and to add or change the valid values or sets of valid values at the same time that the project, task or resource is created.

In the preferred embodiment, a project is created by entering the name or title for the project. In general, the project name must be unique and while it may be possible to enter non-unique project names, but it is generally desirable to use unique project names to avoid confusion. Preferably, secondary information fields for a project can include one or more of the following: division, department, client, sponsor or stakeholder.

In the preferred embodiment, a task is created by entering a name or title for the task, under a previously specified project. Other information essential for creating a task includes the time duration for the performance of the task, a sequence relationship between the order of performance of a given task with respect to other tasks within the project. Preferably, secondary information fields for a project task can include one or more of the following: stream, phase, role or skill In the preferred embodiment, a resource is created by entering the name or label of the resource. Other essential information for creating a resource is the calendar for the resource indicating the dates and times that the resource can be utilized on a project or task. Preferably, secondary information fields for a resource can include one or more of the following: division, department, cost or skill. As one of ordinary skill will appreciate, the cost field could be a primary filed if the project management system used resource cost as part of its native function such as to report and track resource costs.

Preferably, the system 100 uses an enterprise local area network (LAN) 105 which includes one or more database servers 110, for example, Microsoft Back Office Servers, for storing the project management information in the primary database 112. As one of ordinary skill in the art will appreciate, it is not necessary that the primary database 112 be physically located in a central location. It is important, however that the users of the database 112 are provided with a level of access to the same body of data according to the user's needs. Thus, for example a project manager may have full access to the centralized database whereas, a project resource (a person performing a project task) may have limited access to the centralized database only to review the tasks assigned to that resource and input information relating to the performance of the assigned tasks. In addition, the centralized database can be replicated at several locations and thus a copy of the database can be stored on a server at the project manager's site and another copy of the database can be stored on a different server, such as, at the resource's site. Alternatively, the database can be physically divided among several database servers. The two servers can be interconnected and can include a replication mechanism which provides for replicating at least a portion of the data at one site in the database at the other site and vice versa.

The system can also include a reporting workstation, such as workstation 140, which can be used by management or project managers to perform analysis and report information relating to projects, project tasks and resources based upon the secondary information. The project management system can include a reporting function that allows all the data in the central database to be analyzed using the secondary information. The analysis can include multiple project over the entire enterprise. The centralized database can be replicated in a local database and the reporting workstation can prepare analyses and reports offline.

Alternatively, the invention can be utilized in any native application that creates and manipulates data objects and stores the data object on a network. Examples of such native applications include word processors such as Microsoft Word or Corel WordPerfect or spreadsheets such as Microsoft Excel or Lotus 123. With respect to these native applications, the data objects which are created and manipulated (edited, printed and etc.) are the word processing data files or the spreadsheet data files. The data objects are stored in non-volatile memory, typically a hard disk drive, which is essentially a database.

In accordance with an alternative embodiment of the invention, the invention can be embodied in a system for storing and managing data objects such as word processing documents or spreadsheets. For example, in an organization which includes a LAN having a centralized file server for storing word processing documents and/or spreadsheets, users at network workstations create documents and/or spreadsheets using native applications such as Microsoft Word, Corel WordPerfect, Microsoft Excel and/or Lotus 123. After the document or spreadsheet is created, it is stored as a data file in the memory of the network file server (typically on a hard disk) according to primary information which specifies the name of the file and the path or location within the hierarchical structure of the hard disk. The path typically specifies the location of a file in terms of the disk drive designator (for example, C: or F:) and the directory or subdirectory where the file is indexed according to the file structure of the disk.

In accordance with the alternative embodiment of the invention, the native application or the network can be modified to require the user to input secondary information relating to the document or spreadsheet. The secondary information can include information that is not essential to store the data in the memory of the network file server. The secondary information can include one or more fields for category or type information which can be used to classify or categorized the data object with respect to other data objects. This information can include client designators or codes, billing codes, project codes and subproject codes as well as type designators such as research, development and production.

By way of example, in order to save a word processing document or spreadsheet, the user must specify a client code or cost center code or a department designator as well as the file name and path. In addition, the content of at least some of the secondary information can also be validated with respect to a database that lists the predefined valid secondary information field values. This can either be accomplished using a pick list whereby the user selects the secondary information from a predefined list of fields in database or the system can compare the user input to predefined fields in a validation database.

One of the benefits of the invention, is that in an organization that produces documents and spreadsheets, the both types of data objects can utilize the same secondary information fields and values, thus enabling the organization perform a combined analysis of both documents and spreadsheets.

Figure 3:
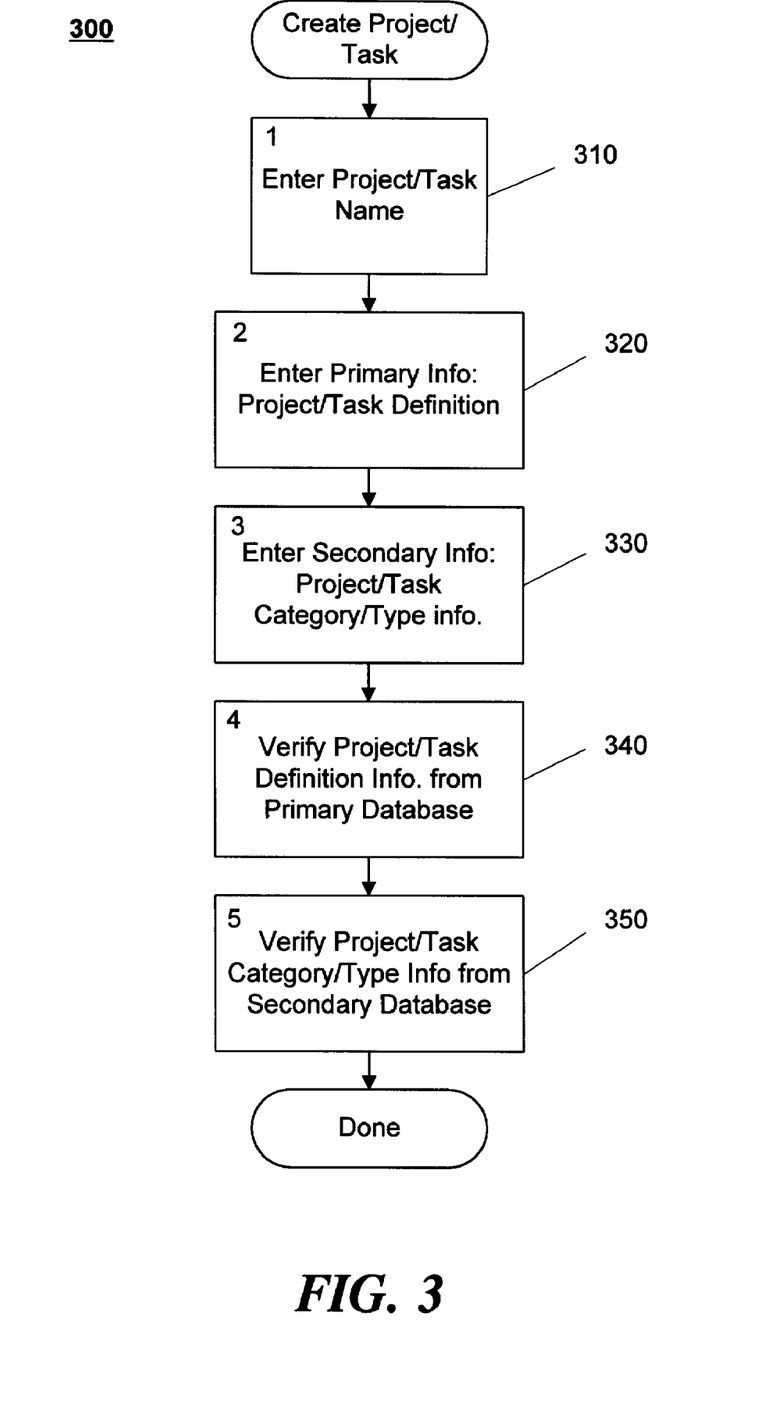
FIG. 3 is flow chart showing a method of validating secondary information in an enterprise project management system in accordance with one embodiment of the invention.

FIG. 3 shows a flowchart of the method 300 according to the invention. The method 300 relates to creating a data object such as a project or task in a project management system. The creating process begins with the step of assigning a name or title to the project or task 310. The next step includes inputting any additional primary information 320. In the case of a project, a file name and path can be input to specify where the project data is stored. In the case of a project task, the duration of the task, the sequence of the task, and the resources assigned to the task are also input.

The next step includes inputting secondary information 330. The type of secondary information will vary depending upon whether the data object is a project or a task.

The method 300 can also include the steps of validating the primary information 340 and validating the secondary information 350. The primary information can be validated to determine whether the title is the correct length, whether the file name and path use the proper syntax, whether the file name is already used and whether the path exists in the directory structure. The secondary information can be validated by comparing each of the required fields to a database containing the predefined valid values. Alternatively, the secondary information can be selected from a pick list, in which case the secondary information can be presumed valid. The order in which the primary and secondary information is validated is not of significant importance.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein,

What is claimed is:

1. A project management system including a general purpose computing system, said project management system comprising:
   A. a primary database configured to store project management information;
   B. an input mechanism adapted to facilitate the storage of said project management information;
   C. a project data object creator configured to create a project data object within said project management system from said project management information, said project management information including:
      1. primary information, including information essential for creating the project data object, said primary information including project task information; and
      2. secondary information, including project data object category information not essential for creating the project data object and useful for performing project reporting functions;
   D. a validation mechanism configured to validate said secondary information with respect to a second database;
   E. an object creation prevention mechanism configured to prevent the creation of a project data object if said validation mechanism cannot validate the secondary information of said project data object with respect to said second database, and
   F. a project scheduler configured to automatically create a project schedule as a function of said primary information.

2. A project management system according to claim 1 wherein said input mechanism includes a local database and said project management system further includes a data transport mechanism configured to transfer project data objects between the local database and the primary database.

3. A project management system according to claim 2 further comprising a replication mechanism configured to replicate at least a portion of said primary database in said local database and for replicating at least a portion of said local database in said primary database and wherein said data transport mechanism provides for intermittent connection and transfer of project management information between the local database and the primary database.

4. A project management system according to claim 2 further comprising a storage mechanism configured to store said project data object in said local database and a transfer mechanism configured to transfer said project data object from said local database at said input mechanism to said primary database.

5. A project management system according to claim 2 wherein said data transport mechanism includes a computer network and said input mechanism includes a network workstation.

6. A project management system according to claim 2 wherein said local database include said second database.

7. A project management system according to claim 2 wherein said second database is a separate database from said local database.

8. A project management system according to claim 1 wherein:
   1. said secondary information includes a field for inputting a type of project data object and said second database includes a set of predefined types of valid data objects, and said validation mechanism compares said field for inputting said type of project data object with said set of predefined types of valid data objects; and
   2. said object creation prevention mechanism prevents the creation of said project data object if the information input into said field for defining a type of project data object does not match one of the predefined types of valid project data objects from said set of valid types of project data objects.

9. A project management system according to claim 1 wherein said project data object includes a project and said primary information consists essentially of a project name.

10. A project management system according to claim 1 wherein said project data object includes a project task and said primary information consists essentially of an associated project name, a task name, a task duration and a task sequence.

11. A project management system according to claim 1 wherein said project data object includes a resource and said primary information consists essentially of a resource name and resource calendar information.

12. A method of creating a project data object in a project management system, said project management system including a primary database configured to store project management information, an input mechanism adapted to facilitate storage of said project management information, and a project scheduler, the method comprising:
   A. inputting project management information to be used to create a project data object, said project management information including:
      1. primary information, including information essential to creating the project data object, said primary information including project task information; and
      2. secondary information, including project data object category information not essential to creating project data objects within the project management system and useful for performing project reporting functions;
   B. validating at least a portion of the secondary information with respect to a second database;
   C. preventing the creation of said project data object if said secondary information is not valid with respect to said second database; and
   D. automatically creating a project schedule as a function of said primary information.

13. A method of creating project data objects according to claim 12 wherein said input mechanism includes a local database and said project management system further includes a transport mechanism configured to transfer said project management information between said local database and said primary database, the method further including the steps of:

E. storing said project data object in said local database; and

F. transferring said project data object from said local database to said primary database over said transport mechanism.

14. A method of creating project data objects according to claim 12 wherein said secondary information includes one or more data fields containing data and said validating the secondary information includes the step of comparing the data of at least one of said data fields to a set of values from said second database to determine if the data matches one of said values of the set.

15. A method of creating project data objects according to claim 12 wherein said validating the secondary information includes limiting the input of information to selecting said information from a list of predefined values.

16. A system for managing data objects comprising:

A. a primary database configured to store data objects;

B. an input mechanism adapted to facilitate storage of data used to create data objects;

C. a transport mechanism configured to transfer data objects between said input mechanism and said primary database;

D. a storage mechanism configured to store said data object in said primary database in accordance with a native application for processing said data object, said data object being composed of:
1. primary information, including information essential for storing said data object in accordance within said native application; and
2. secondary information, including data object category information not essential to storing said data object with respect to the native application;

E. a validation mechanism configured to validate at least a portion of said secondary information with respect to a second database; and F. an object storage prevention mechanism configured to prevent the data object from being stored in said database if said secondary information cannot be validated with respect to said second database, wherein said primary and secondary information may be information from other than predetermined linked hierarchical groups of data.

17. A system for managing data objects according to claim 16 wherein said input mechanism includes a local database for storing data objects and said system further includes data transport mechanism for transferring data objects between said input mechanism and said primary database.

18. A system for managing data objects according to claim 16 wherein said data objects are word processing data files and said native application is a word processing program including an object creation mechanism configured to create, edit, and store the word processing data files in the primary database.

19. A method of storing data objects produced by a native application in a primary database, said native application residing and operating on a general purpose computing device, the method comprising:

A. inputting said data object as a function of:
1. primary information, including information essential for storing said data object in said primary databases and
2. secondary information including data object category information not essential for storing said data object in said primary database;

B. validating at least a portion of said secondary information with respect to a second database; and C. preventing the creation of said data object if said secondary information is not valid with respect to said second database,
wherein said primary and secondary information may be information from other than predetermined linked hierarchical groups of data.

* * * * *